United States Patent
Gehin

(10) Patent No.: US 10,807,641 B2
(45) Date of Patent: Oct. 20, 2020

(54) METHOD FOR INTERACTIVE CONTROL OF THE AUTOMATIC PARKING OF A MOTOR VEHICLE BY MEANS OF A MOBILE TERMINAL

(71) Applicant: VALEO COMFORT AND DRIVING ASSISTANCE, Créteil (FR)

(72) Inventor: Frederic Gehin, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/574,895

(22) PCT Filed: May 20, 2016

(86) PCT No.: PCT/FR2016/051205
§ 371 (c)(1),
(2) Date: May 4, 2018

(87) PCT Pub. No.: WO2016/185151
PCT Pub. Date: Nov. 24, 2016

(65) Prior Publication Data
US 2018/0237069 A1     Aug. 23, 2018

(30) Foreign Application Priority Data
May 20, 2015   (FR) ..................................... 15 54536

(51) Int. Cl.
*B62D 15/02*       (2006.01)
*G05D 1/00*        (2006.01)
(Continued)

(52) U.S. Cl.
CPC ....... *B62D 15/0285* (2013.01); *G05D 1/0038* (2013.01); *G05D 1/0212* (2013.01); *G06K 9/00805* (2013.01); *G08G 1/168* (2013.01)

(58) Field of Classification Search
USPC .......................................................... 701/41
See application file for complete search history.

(56) References Cited

U.S. PATENT DOCUMENTS

2007/0198190 A1*  8/2007  Bauer ..................... B60D 1/62
                                                        701/301
2014/0121883 A1*  5/2014  Shen .................. B62D 15/0285
                                                         701/28
(Continued)

FOREIGN PATENT DOCUMENTS

DE    10 2011 003231 A1    8/2012
DE    10 2011 079703 A1    1/2013
(Continued)

OTHER PUBLICATIONS

EP2295281—Machine Translation.*
(Continued)

*Primary Examiner* — Aniss Chad
*Assistant Examiner* — Mahmoud M Kazimi
(74) *Attorney, Agent, or Firm* — Osha Liang LLP

(57) ABSTRACT

The invention relates to a method for interactively controlling the automatic parking of a motor vehicle (10) in a parking space (50) by means of a mobile terminal (30), involving the following steps: selection by the user of an automatic parking mode of the motor vehicle, and —automatic parking of the motor vehicle during the course of which the vehicle computer (21) controls the orientation of the wheels (13) and the power train (14) of the motor vehicle. According to the invention, each piece of information emitted by the obstacle detection assistance means (25, 26) fitted to the motor vehicle is transmitted to the mobile terminal in order to signal the possible presence of an obstacle (60) to a user located outside of the motor vehicle.

8 Claims, 1 Drawing Sheet

Figure 1:
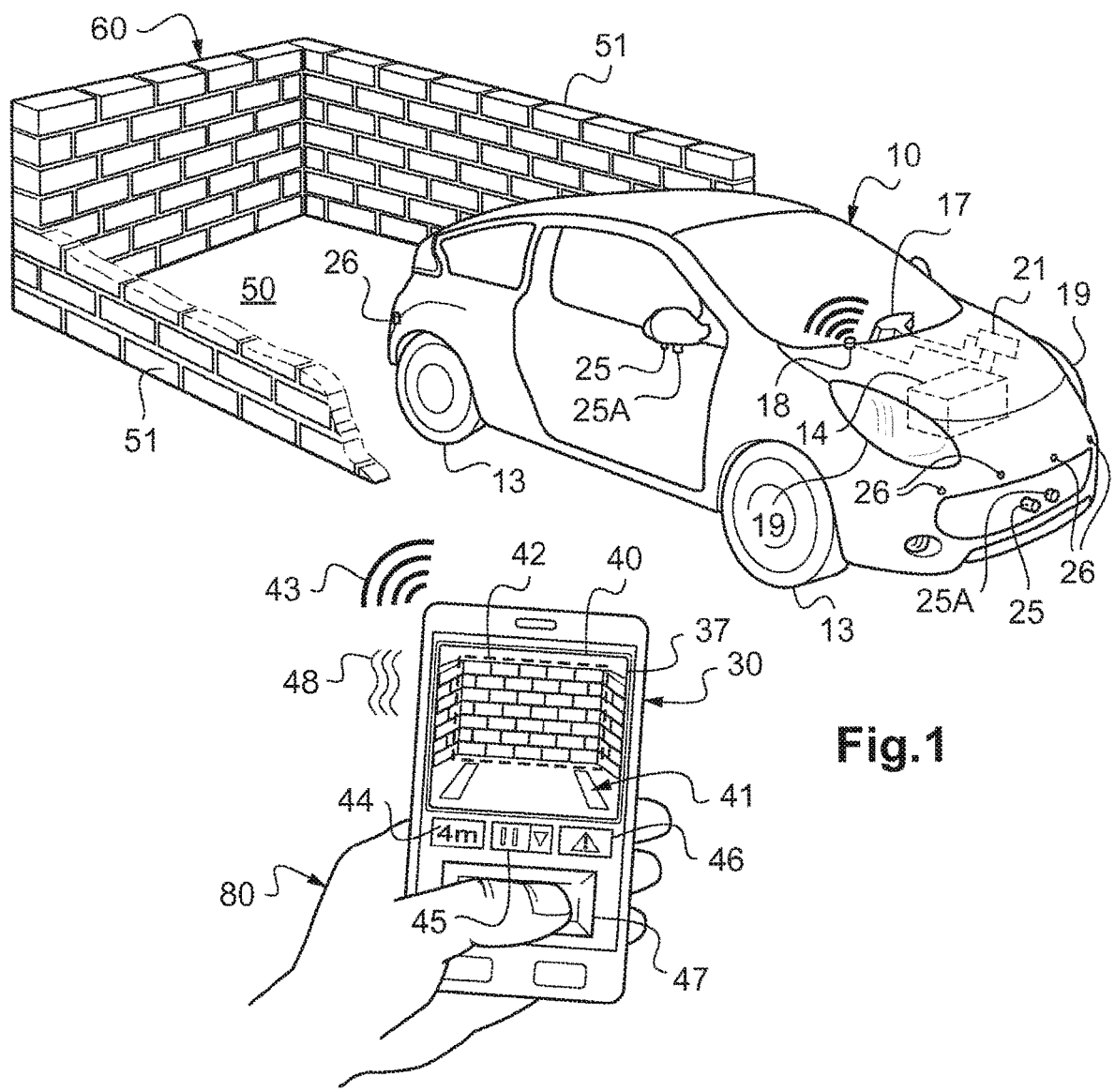

(51) Int. Cl.
*G05D 1/02* (2020.01)
*G06K 9/00* (2006.01)
*G08G 1/16* (2006.01)

(56) References Cited

U.S. PATENT DOCUMENTS

2015/0127208 A1* 5/2015 Jecker .................. B62D 1/00
701/23
2015/0175205 A1* 6/2015 Park .................. B62D 15/0285
701/41
2016/0272244 A1* 9/2016 Imai .................. G08G 1/166

FOREIGN PATENT DOCUMENTS

| DE | 10 2012 007984 A1 | 3/2013 | |
| EP | 2295281 A1 * | 3/2011 | ............... B62D 1/00 |
| EP | 2 617 627 A2 | 7/2013 | |

OTHER PUBLICATIONS

International Search Report of the International Searching Authority issued in PCT/FR2016/051205 dated Jul. 21, 2016 (3 pages).
Written Opinion of the International Searching Authority issued in PCT/FR2016/051205 dated Jul. 21, 2016 (6 pages).

* cited by examiner

METHOD FOR INTERACTIVE CONTROL OF THE AUTOMATIC PARKING OF A MOTOR VEHICLE BY MEANS OF A MOBILE TERMINAL

TECHNICAL FIELD TO WHICH THE INVENTION IS RELATED

The present invention generally relates to motor vehicle parking assistance.

It relates more particularly to a method for interactive control of the automatic parking of a motor vehicle in a parking space, by means of a mobile terminal.

It applies to a motor vehicle that is provided with:
command means for controlling the orientation of the wheels,
control means for controlling a power train,
at least one obstacle detection assistance means,
interaction means placed in a passenger compartment of the motor vehicle, and
a computer which is suited to controlling said command and control means, and which is suited to transmitting, according to data received from each obstacle detection assistance means, a piece of information to said interaction means in order to indicate the possible presence of an obstacle to a user seated in the motor vehicle.

TECHNOLOGICAL BACKGROUND

Parking a motor vehicle is often a source of problems and anxiety for the driver.

This is the reason why parking assistance systems have been developed, making it possible, for example, to emit a sound signal when the rear of the vehicle approaches an obstacle or displaying on a screen present in the passenger compartment images filmed in real time by a camera located at the rear of the vehicle.

For further facilitating the parking of the vehicle, systems have recently been developed making it possible for the vehicle to park on its own, i.e. automatically, without any intervention from the driver but still under their supervision and therefore their responsibility. These autonomous but not responsible systems operate notably thanks to obstacle detection assistance means, which inform the vehicle of the position of the parking space and the possible presence of obstacles.

In the case where the parking space is so small that once the vehicle is parked, the driver will no longer be able to open the doors, it is provided that the driver may be located outside the passenger compartment while the vehicle is being parked.

Since these automatic parking systems are not infallible, and because the driver remains legally responsible for the maneuver, a solution has been developed for allowing the user to interrupt the maneuver from their mobile terminal if they perceive a danger.

This solution consists in asking the user to exert a pressure on their mobile terminal to allow the vehicle to be parked, although they may interrupt this parking operation by simply releasing the pressure that they exert on the touch screen of their smartphone.

This solution remains imperfect since it has been found that it does not allow the driver to interact as well with the vehicle's environment as if they were seated in their vehicle.

SUBJECT MATTER OF THE INVENTION

In order to remedy the aforementioned drawback of the prior art, the present invention provides for making the operation of parking the vehicle more secure when the driver is outside the vehicle, by reproducing as much as possible the situation of the driver when they are inside the vehicle.

More particularly, a method is provided according to the invention as defined in the introduction, in which provision is made for steps of selection by the user of an automatic parking mode for parking the motor vehicle, then of automatic parking of the motor vehicle in the course of which:
the computer controls said command and control means according to each piece of information received from each obstacle detection assistance means,
each piece of information is transmitted by the computer to the mobile terminal in order to indicate the possible presence of an obstacle to a user (the driver) located outside the motor vehicle.

Thus, thanks to the invention, the information that the driver could access if they were located in the passenger compartment of the vehicle is transmitted to the mobile terminal, so that the driver located outside the vehicle may access all of this information. In this way, the driver may grasp the vehicle's environment more efficiently and, accordingly, detect any danger faster.

The driver may further benefit from all the options available, namely interrupting the maneuver, changing maneuver, continuing the maneuver, etc.

They may also better understand, when the vehicle detects an obstacle, why the vehicle stops. Indeed, they may, for example, observe on their mobile terminal the images acquired by the vehicle's cameras and understand which obstacle the vehicle's computer considers to be the hindrance.

Other advantageous and non-restrictive features of the method in conformity with the invention are as follows:
said mobile terminal comprising a display screen, said motor vehicle comprising a plurality of obstacle detection assistance means each suited to transmitting different data to the computer, in the course of the automatic parking step, the computer prepares a plurality of pieces of information according to said data, and the user selects with the assistance of the mobile terminal, from among said prepared information, at least one piece of information to be displayed on said display screen;
said information is included in the following list:
an image acquired by a camera provided on the motor vehicle,
a recreated image, prepared according to a plurality of images acquired by a plurality of cameras provided on the motor vehicle,
a pattern illustrating the trajectory of the motor vehicle, to be superimposed on said acquired image or on said recreated image,
a pattern indicating an obstacle, to be superimposed on said acquired image or on said recreated image,
a sound warning indicating an obstacle, e.g. an alternating beep of a frequency proportional to the distance separating the obstacle from the vehicle,
a visual warning indicating an obstacle,
a vibration indicating an obstacle,
a distance before hitting an obstacle, or
an indicator relating to a set of maneuvers that the vehicle is able to execute;
said mobile terminal comprising a display screen, said motor vehicle comprising at least two cameras, in the course of said automatic parking step, the mobile terminal places at the disposal of the user a means enabling them to choose the display on the display screen of the images acquired by either the one or the other of the cameras;

the mobile terminal comprising acquisition means for acquiring at least one control instruction for controlling the motor vehicle issued by the user and transmission means for transmitting this control instruction to the motor vehicle's computer, in the course of said automatic parking step, the computer controls said command and control means according to each control instruction received from the mobile terminal;

said control instruction is included in the following list:
an instruction for turning the lighting means of the motor vehicle on or off,
a type of maneuver to be executed,
a gear to be engaged,
an instruction to interrupt the parking maneuver,
an instruction to continue the parking maneuver, or
an item of data relating to the user's ability to continue the parking maneuver;

prior to said automatic parking step, a step of networking the mobile terminal with the motor vehicle's computer is provided in the course of which the mobile terminal and the computer exchange at least one item of networking data;

said item of networking data is included in the following list:
a communication language for the user,
a piece of information characterizing the motor vehicle,
a piece of information characterizing the mobile terminal,
a piece of information supplying the version of an application stored in the motor vehicle's computer,
a piece of information supplying the version of an application stored in the mobile terminal, or
a priority status of the application stored in the mobile terminal.

DETAILED DESCRIPTION OF AN EMBODIMENT

The following description in conjunction with the appended drawings, given by way of non-restrictive examples, will elucidate the substance of the invention and how it may be implemented.

Figure 2:
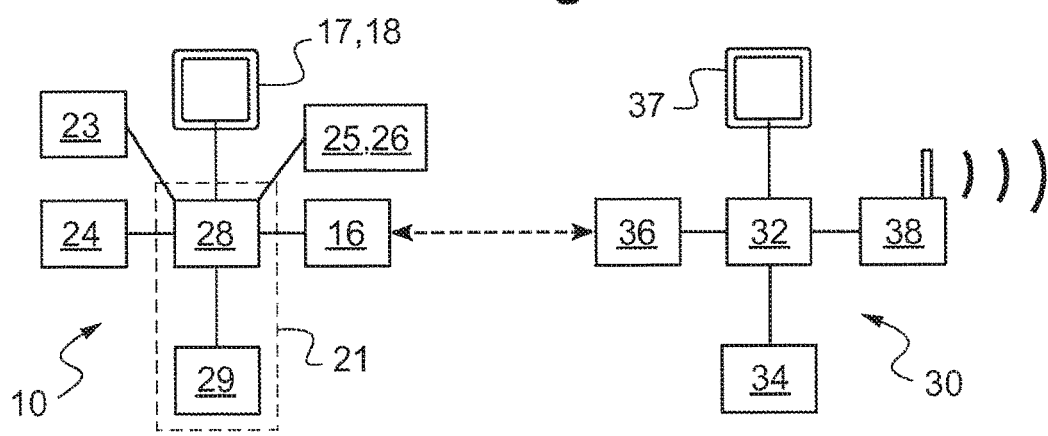

In the appended drawings:

FIG. 1 is a schematic perspective view of a motor vehicle and a mobile terminal held by the driver of the motor vehicle, and FIG. 2 schematically represents components, helpful to the understanding of the invention, of the motor vehicle and of the mobile terminal in FIG. 1.

FIG. 1 represents a motor vehicle 10 substantially located in the axis of a parking space 50, in front of the latter.

As seen in FIG. 1, the motor vehicle 10 is an automobile comprising four wheels 13, including two front steered wheels.

As a variant, it could be a motor vehicle including three or more wheels.

Conventionally, this motor vehicle 10 comprises a chassis that notably supports a power train 14 (namely an engine and transmission means for transmitting the engine torque to the drive wheels), a steering system for varying the angle of orientation of the two front steered wheels, bodywork elements and passenger compartment elements.

As seen in this FIG. 1, the parking space 50 is delimited by two side walls 51 between which the driver wishes to park the motor vehicle 10.

It will be noted at this stage that the distance between these two side walls 51 is sufficient here for parking the vehicle 10 in the parking space 50, but that it is not sufficient to allow the driver of the vehicle to open one of the doors in order to enter or exit their vehicle.

An obstacle 60, here formed by a third stone wall, is located at the back of the parking space 50.

In FIG. 1, the hand of a user (here, the driver of the motor vehicle 10) is also seen holding a mobile terminal 30.

Here this mobile terminal 30 is a smartphone.

As a variant, it could be another type of mobile terminal, e.g. a remote control dedicated to controlling the parking of the motor vehicle 10 or a remote control dedicated to controlling various functions of the motor vehicle (locking and unlocking the doors, starting the engine, controlling the parking of the motor vehicle 10, etc.). It could also be a connected watch, a connected pair of eyeglasses, or a tablet computer.

The invention relates here to a method allowing the driver of the motor vehicle 10 to supervise, from outside the vehicle, that the motor vehicle 10 is automatically parked and without any problem in the parking space 50, thanks to this mobile terminal 30.

In the context of the present invention, the motor vehicle 10 includes an Electronic Control Unit (ECU), here referred to as a computer 21, which can communicate via a wireless link with the mobile terminal 30 in order to exchange data with this mobile terminal 30.

Here, the wireless link used for communicating between the computer 21 and the mobile terminal 30 is, for example, a Bluetooth link.

FIG. 2 schematically represents components, helpful to the understanding of the invention, of the motor vehicle 10 and of the mobile terminal 30.

In this FIG. 2, it is seen that the motor vehicle 10 includes, in addition to the computer 21 already mentioned, command means 23 for controlling the steering system, control means 24 for controlling the power train 14, at least one obstacle detection assistance means 25, 26, interaction means 17, 18 located in the passenger compartment of the motor vehicle 10, and a wireless communication module 16.

The command means 23 make it possible to vary the orientation of the steered wheels 13, without the intervention of the driver on the steering wheel of the motor vehicle.

The control means 24 for controlling the power train 14 are notably suited to controlling the speed of the engine and the engaged gear, without any intervention from the driver.

A plurality of obstacle detection assistance means 25, 26 are provided here.

Thus, as depicted in FIG. 1, the motor vehicle is provided with sensors 26 (of the ultrasound, radar, sonar, or lidar type), including front sensors located at the front of the motor vehicle for determining the distances between these sensors and the nearest obstacle to the front of the vehicle, and including rear sensors located at the rear of the motor vehicle for determining the distances between these sensors and the nearest obstacle to the rear of the vehicle. These various sensors 26 are provided for communicating the aforementioned distances to the computer 21.

The motor vehicle is also provided with cameras 25, here four in number, which are respectively located at the front of the motor vehicle 10 for acquiring an image of the area located in front of the vehicle, at the rear of the motor vehicle for acquiring an image of the area located at the rear of the vehicle, and on each side of the vehicle (here in the outside rear-view mirrors) for acquiring images of the areas located on each side of the vehicle. These cameras 25 are provided for communicating the aforementioned images to the computer 21, in a continuous stream.

Light sources 25A, separate from the headlights 19 of the vehicle, are provided here next to each camera 25 for illuminating the area filmed by each camera 25.

The interaction means 17, 18, which are located in the passenger compartment of the motor vehicle 10 for allowing the driver to interact with the computer 21, in their turn here comprise a screen 17 and at least one sound emitter 18. They could comprise other elements (e.g. a vibrator in the seat or in the steering wheel of the vehicle).

The screen 17 here is a touch screen, which allows the driver to see information being displayed and to enter data. As a variant, it could be a display associated with a keyboard.

The sound emitter 18 is formed here by the set of speakers provided on the vehicle. As a variant, it could be a sound emitter provided on the screen 17.

The screen 17 and the sound emitter 18 are controlled by the computer 21.

For this purpose the computer 21 includes a processor 28 and a storage unit 29 (see FIG. 2), e.g. a rewritable non-volatile memory or a hard disk.

The storage unit 29 notably stores data used in the context of the method described below, notably a virtual key VK, an identification number VID assigned to the motor vehicle 10 and/or a serial number N assigned to the computer 21.

The storage unit 29 also stores a computer application, consisting of computer programs including instructions the execution of which by the processor 28 allows the implementation by the computer 21 of the method described below. The version of this application is also stored in the storage unit 29.

The computer 21 is notably suited to preparing, according to the data (images and distances) received from the cameras 25 and sensors 26, information to be displayed on the screen 17 or to be emitted via the sound emitter 18, when this proves useful, notably in the case of an obstacle detected when the driver parks their vehicle in a parking space 50.

The computer 21 is also suited to controlling the command means 23 for controlling the steering of the vehicle, and the control means 24 for controlling the speed of the vehicle, without any intervention from the driver, in order to park the motor vehicle automatically (thanks only to the data received from the cameras 25 and the sensors 26).

The computer 21 is also suited to automatically command turning the light sources 25A and headlights 19 on and off, when this proves useful.

As depicted in FIG. 2, the mobile terminal 30 in its turn includes a processor 32, a memory 34 (e.g. a rewritable non-volatile memory), a wireless communication module 36, a communication module 38 on the mobile telephony network, and a user interface (here a touch screen 37, but it could be a screen coupled to a keyboard).

The memory 34 notably makes it possible for the mobile terminal 30 to store a user application, intended to facilitate the command of the functionalities of the motor vehicle 10 by means of this mobile terminal 30. The version of this application is stored in the memory 34.

The memory 34 is also suited to storing a virtual key VK, which will allow the motor vehicle's 10 computer 21 to authenticate the mobile terminal 30 in order to allow it access to the functionalities of the motor vehicle 10 if it is authorized to do so.

The wireless communication module 36 of the mobile terminal 30 makes it possible to establish a wireless link (here a Bluetooth link as already mentioned) with the wireless communication module 16 of the motor vehicle 10, through which the processor 28 of the computer 21 and the processor 32 of the mobile terminal 30 may exchange data, notably as disclosed farther on.

The subject matter of the present disclosure is then related more precisely to a method of interactive control (by means of the mobile terminal 30) of the motor vehicle 10 when this vehicle is automatically parked in a parking space 50.

Here the case will be considered where the driver, after stopping their motor vehicle 10 near the parking space 50, exits the vehicle and wishes the motor vehicle 10 to automatically park in this parking space 50, without any direct human intervention on the orientation of the steered wheels.

In this case, the driver must, however, ensure that the motor vehicle 10 parks in the desired place, safely and smoothly. It is for facilitating these supervision operations that the following method will be implemented.

The method begins when the driver selects an automatic parking mode for parking the motor vehicle 10. They may select this mode either on the screen 17 provided in the motor vehicle (in which case they have a sufficient period of time for exiting the vehicle), or on the touch screen 37 of the mobile terminal 30.

Then the automatic parking step for parking the motor vehicle 10 begins.

In the course of this step, the computer 21 controls said command 23 and control means 24 according to the information received from the cameras 25 and the sensors 26, information which for this purpose is processed for enabling the computer 21 to determine the position of the parking space 50 (between the side walls 51) and the position of any possible obstacles 60.

This operation for controlling the command 23 and the control means 24 being known to the person skilled in the art and not forming per se the subject matter of the present invention, it will not be described here in more detail.

Also in the course of this step, the computer 21 may display images on the screen 17 and emit sounds via the sound emitter 18, so as to inform the driver (if they are in the passenger compartment) of the presence and proximity of obstacles 60.

This operation of displaying images and emitting sounds is also known to the person skilled in the art and not forming per se the subject matter of the present invention, it will not be described here in more detail.

According to a particularly advantageous feature of the invention, in the course of the automatic parking step for parking the vehicle, the computer 21 transmits to the mobile terminal 30 at least the images acquired by one of the cameras 25 and/or a distance parameter measured thanks to one of the sensors 26, so that the driver may perceive the possible presence of an obstacle 60, with the assistance of the mobile terminal 30.

Put another way, the present invention provides for supplying the driver 80 (thanks to the mobile terminal 30) with at least a part of the information facilitating the parking of the vehicle which they would have available (thanks to the screen 17 or to the sound emitter 18) if they were in the passenger compartment of the motor vehicle 10.

Preferably, the driver 80 is supplied, thanks to the mobile terminal 30, all of this information facilitating the parking of the vehicle.

In this way, when the driver is outside the vehicle, they have a body of information assisting them to supervise that the vehicle parks safely in the parking space 50.

The way the method proceeds may now be described in detail.

Conventionally, the computer 21 checks at regular intervals whether a mobile terminal enters the field of reception of its wireless communication module 36.

Thus, when the driver's mobile terminal 30 enters this field of reception, a Bluetooth link is established between these two devices.

Accordingly, when the driver starts the user application stored in the memory 34 of their mobile terminal 30 and they select the automatic parking mode for parking the motor vehicle 10, this instruction is capable of being communicated to the computer 21 of the motor vehicle 10.

However, before communicating this instruction to the computer 21, it is necessary that the mobile terminal 30 and the computer 21 are mutually identified and authenticated.

Then, a step of networking the mobile terminal 30 with the motor vehicle's 10 computer 21 is provided, for ensuring communication between these two devices.

For this, the mobile terminal 30 first of all displays on its screen 37 questions making it possible to identify the motor vehicle that the driver wishes to see maneuver (this operation is notably necessary when the driver is located in a garage in which a plurality of vehicles belonging to them are parked).

Thus, the mobile terminal may be programmed to ask the make, model or even the color of the vehicle that the driver wishes to see maneuver. This question may, for example, be put forward in the form of a menu in which vehicles registered as belonging to the driver are listed.

Once the motor vehicle 10 is identified, an authentication is necessary for assuring the motor vehicle that the mobile terminal 30 is authorized to control the motor vehicle 10.

This authentication operation being known to the person skilled in the art, it will not be described here in detail. It will only be explained that it may involve, for the computer 21, sending a message (or "challenge") to the mobile terminal 30, encrypting this message thanks to its virtual key VK, waiting for the mobile terminal 30 to return this message in encrypted form (it should be remembered that the memory of the mobile terminal 30 also stores the virtual key VK) and comparing these two encrypted messages in order to check that they are identical.

Information characterizing the motor vehicle 10 and the mobile terminal 30 may also be exchanged for facilitating their identification. It may, for example, be the identification number VID assigned to the motor vehicle 10 and/or the serial number N assigned to the computer 21, and the IMEI number of the mobile terminal 30 (in the case envisaged where this mobile terminal is a mobile phone).

In the course of this step of networking, the mobile terminal 30 and the computer 21 may also exchange other networking data, including:
  a communication language for the user 80,
  a piece of information supplying the version of the application stored in the motor vehicle's 10 computer 21,
  a piece of information supplying the version of a user application stored in the mobile terminal 30,
  a priority status of the user application stored in the mobile terminal 30.

The communication language enables the computer 21 to inquire the language that the driver 80 wishes to use, e.g. French, English or German.

For this, provision may be made for the computer 21 to command the display on the screen 37 of the mobile terminal 30 of a message asking the driver to enter this information.

As a variant, provision may be made for the computer 21 to ask for this information from the mobile terminal 30, which knows it already since the driver has programmed the mobile terminal so that it communicates in a particular language.

The information supplying the versions of the applications stored in the computer 21 and in the mobile terminal 30 allows these two devices to check whether they are suited to communicating together. If such is not the case, the operation of parking the vehicle is interrupted until at least one of these applications is updated.

Finally, the priority status of the user application allows the mobile terminal 30 and the computer to know the priority nature of this user application over other applications stored in the memory 34 of the mobile terminal 30. Thus, by associating less priority with the user application than the telephony application stored in the memory 34 of the mobile terminal 30, it is ensured that the operation of parking the vehicle will be automatically suspended as soon as a telephone call arrives on the mobile terminal 30.

When all this networking data has been exchanged between the mobile terminal 30 and the motor vehicle's 10 computer 21, the instruction to start the automatic parking of the vehicle is supplied to the computer 21.

A preliminary step may then be optionally implemented. This step consists in checking whether the mobile terminal 30 is inside or outside the motor vehicle 10.

Clearly if the mobile terminal 30 is inside the vehicle (which means that the driver is in their driving position), the information facilitating the supervision of parking the vehicle will not necessarily have to be transmitted to the mobile terminal 30 (it would indeed be redundant with that already displayed on the screen 17 of the vehicle).

The opposite case will be considered here, where the driver and their mobile terminal 30 are detected as being outside the vehicle. In this case, provision may be made for the information facilitating the supervision of parking the vehicle not to be transmitted to the screen 17 and to the sound emitter 18, but only to the mobile terminal 30.

The mobile terminal 30 then displays on its screen 37 a message inviting the driver to choose the type of maneuver that they wish their vehicle to proceed with for parking in the parking space 50.

Thus, the driver may choose, for example, and in a not-restrictive way that their vehicle is parked at an angle, perpendicular and forward, perpendicular and in reverse, or parallel-parked.

The driver may also select an exploratory mode, in the case where there is no marking provided on the ground. In this case, the vehicle will be parked only according to the position of the identified obstacles.

The driver may also select an automatic mode, in the case where markings on the ground are provided. In this case, the vehicle will be parked according to the position of the markings identified on the ground and the detected obstacles.

This instruction, once validated, is then transmitted to the motor vehicle's computer 21, so that it may calculate the trajectory that the vehicle has to take for parking in the parking space 50.

Before starting the motor vehicle 10, the user application stored in the mobile terminal 30 commands the display on the screen 37 of various information, part of which allows the driver to supervise the operation of parking the motor vehicle 10 and the other part of which allows the driver to interact with the motor vehicle 10.

Thus FIG. 1 represents an example of display mode of this information on the screen 37. Of course, other display modes could be envisaged.

Thus, in the example represented, the screen 37 displays, on an upper half, an image acquired by at least one of the cameras 25 provided on the motor vehicle 10. It may be a raw image or a processed image or a recreated image.

Thus it may be the raw image, acquired in real time by one of the four cameras 25. In the rest of this disclosure, a front or rear or side view will be referred to.

It could also be a processed image, e.g. in order to reduce the problems of brightness, distortion or viewing angle posed by the cameras.

Finally it could be a recreated image, prepared according to images acquired by a plurality of cameras 25 provided on the motor vehicle 10. It could thus notably be a top view recreating the environment of the vehicle. In the rest of this disclosure, a "bird's-eye" view will be referred to.

In the example represented in FIG. 1, it is the rear view 40.

The screen 37 further displays, by superimposition of this image, a pattern 41 illustrating the trajectory of the motor vehicle 10.

It could be a static pattern, formed of two rectilinear strips illustrating the trajectory that the vehicle would take if the steered wheels thereof were kept straight.

Preferably, it will be a dynamic pattern 41 formed by two curved strips illustrating the trajectory that the motor vehicle 10 will take, taking account of the orientation of the vehicle's steered wheels.

The screen 37 further displays, by superimposition of this image, patterns 42 indicating the detected obstacles 60. As depicted in FIG. 1, here this is a rectangle in dotted lines, which flashes on the screen and which allows the driver to check that the vehicle has actually detected the obstacle 60. This obstacle could have been detected thanks to the cameras 25 alone, or also thanks to the sensors 26.

The position of this obstacle 60 could also be indicated by the speaker of the mobile terminal 30, thanks to a sound warning 43 (e.g. by "beeps" increasingly closer together when the distance separating the vehicle from the obstacle decreases). Provision could also be for the mobile terminal 30 to emit vibrations 48 increasingly closer together when the distance separating the vehicle from the obstacle 60 decreases.

This obstacle 60 could also be indicated by a visual warning message 46 on the screen. Here, this warning message is formed by a flashing panel 46 represented in the rear view 40.

This obstacle 60 could finally be indicated by the value of the distance separating the vehicle from the obstacle 60 (measured thanks to the sensors 26). This value will be presented here in the form of a message 44 located in the rear view 40.

The lower area of the screen 37 of the mobile terminal 30 will further enable the driver 80 to interact with the motor vehicle 10.

It thus make it possible to acquire at least one control instruction issued by the driver 80, so that this control instruction is transmitted to the motor vehicle's 10 computer 21 and the automatic parking of the vehicle is carried out according to this control instruction.

Thus, as depicted in FIG. 1, a screen area 37 displays a pull-down menu 45 enabling the driver 80, when the vehicle has begun its parking maneuver, to change the type of maneuver that the vehicle has to execute (parking at an angle, parallel parking, etc.).

Furthermore, a pressure area 47 on the screen 37 will allow the driver to transmit an instruction to interrupt the parking maneuver, or an instruction to continue the parking maneuver, or an item of data relating to their ability to continue the parking maneuver.

Here, this pressure area is delimited by a rectangle displayed in the lower part of the screen 37. The diagonals of this rectangle are also displayed.

For the parking to begin, the driver should press on the pressure area 47, so that the mobile terminal 30 supplies the motor vehicle's computer 21 with an instruction to continue the parking maneuver.

As long as this pressure is maintained, the computer 21 considers that the motor vehicle 10 may continue its parking maneuver.

On the other hand, as soon as this pressure is released, the mobile terminal 30 supplies the motor vehicle's computer 21 with an instruction to interrupt the parking maneuver, so that the vehicle stops.

When this pressure is released, provision may be made for the mobile terminal 30 to command additional menus to be displayed on its screen 37, allowing, for example, the driver to force the light sources 25A or headlights to be turned on or off, in order to see the obstacles better.

Here, provision may also be made for the view displayed at the top of the screen 37 to change according to the position of the driver's finger in the pressure area 47. Thus, when the driver presses on the center of the pressure area 47, the screen 37 displays the bird's-eye view. When the driver presses on the upper (respectively lower or side) part of the pressure area 47, the screen 37 on the contrary displays the front view (respectively the rear view or the corresponding side view). In this way, the driver may easily switch from one view to another.

In the case where the bird's-eye view is selected, provision may be made for it to be displayed over the whole screen 37, superimposed on the other displayed information. Otherwise, provision may be made for this other information to appear on one of the edges of the screen.

Finally, provision may be made that when the driver's 80 finger remains pressing on the screen 37 but exits the pressure area 47, which is interpreted as being a sign that the driver is distracted, the mobile terminal 30 supplies the motor vehicle's computer 21 with an instruction to interrupt the maneuver or at least slow it down. The position of the finger with respect to the pressure area 47 therefore constitutes an item of data relating to the user's 80 ability to continue the parking maneuver.

In this case provision may also be made for the mobile terminal 30 to emit a sound and/or a vibration for warning the driver.

Once the motor vehicle 10 is parked in the parking space 50, the computer 21 commands an end of operation message to be displayed on the screen 37 of the mobile terminal 30.

Then, the motor vehicle 10 is parked in the parking space 50. Thus it should be noted that the driver was able to park the motor vehicle in a parking space that they could not have used, unless remaining stuck in their vehicle because of the proximity of the side walls 51 which would have prevented them from opening the doors of the vehicle.

The present invention is in no way restricted to the embodiment described and represented, but the person skilled in the art will know how to apply any variant that falls within its spirit.

Provision could thus be made for the pressure area not to be confused with the area where the driver has to press for changing the view. Provision could thus be made for the change of view to be carried out by pressing a button on the mobile terminal 30, separate from the screen 37.

In this variant, provision could be made for the pressure area to be formed by the whole screen 37.

The driver could then be asked to constantly move their finger on the screen 37, so as to check that they are paying attention to the maneuver.

According to another embodiment of the invention, provision could be made for the mobile terminal 30 to display on its screen a menu allowing the driver to force the vehicle to engage a different gear from that engaged, so that the vehicle is parked otherwise than along the computed trajectory. Thus, the driver could, for example, force the vehicle to partially withdraw from the parking space, if they consider that the trajectory taken by the vehicle does not ensure the desired safety level.

The invention claimed is:

1. A method for interactive control of the automatic parking of a motor vehicle in a parking space by a mobile terminal that comprises a display screen, said method comprising:
    displaying, on the display screen of the mobile terminal, a message that prompts a user to identify the motor vehicle to be parked from among a plurality of vehicles;
    selection, by the user, of an automatic parking mode for parking the motor vehicle;
    selection, by the user and on the display screen of the mobile terminal, of a type of maneuver for parking the motor vehicle from a group consisting of: parking at an angle, perpendicular forward parking, perpendicular parking in reverse, and parallel parking;
    automatic parking of the motor vehicle, in the course of which a computer controls a wheel orientation controller that controls the orientation of the wheels of the motor vehicle and a power train controller that controls a power train of the motor vehicle according to information received from at least one obstacle detection assistant;
    transmission by the computer, according to data received from each obstacle detection assistant, a piece of the information to a user interface located in a passenger compartment of the motor vehicle to inform the user of the possible presence of an obstacle; and
    transmission of said information, in the course of the automatic parking step, by the computer to the mobile terminal to indicate the possible presence of an obstacle to a user located outside the motor vehicle.

2. The method for interactive control as claimed in claim 1, wherein said motor vehicle comprises a plurality of obstacle detection assistants each for transmitting different data to the computer, the method further comprising:
    preparing by the computer, in the course of the automatic parking step, a plurality of pieces of information according to said data; and
    selection, by the user with the assistance of the mobile terminal, from among said prepared information, at least one piece of information to be displayed on said display screen.

3. The method for interactive control as claimed in claim 1, wherein said information is included in the following list:
    an image acquired by a camera provided on the motor vehicle,
    a recreated image, prepared according to a plurality of images acquired by a plurality of cameras provided on the motor vehicle,
    a pattern illustrating the trajectory of the motor vehicle, to be superimposed on said acquired image or on said recreated image,
    a pattern indicating an obstacle, to be superimposed on said acquired image or on said recreated image,
    a sound warning indicating an obstacle,
    a visual warning indicating an obstacle,
    a vibration indicating an obstacle,
    a distance before hitting an obstacle, or
    an indicator relating to a set of maneuvers that the motor vehicle is able to execute.

4. The method for interactive control as claimed in claim 1, wherein said motor vehicle comprises at least two cameras, the method further comprising:
    placing by the mobile terminal, in the course of said automatic parking step, at the disposal of the user, a selector that enables the user to choose the display on the display screen of the images acquired by either the one or the other of the cameras.

5. The method for interactive control as claimed in claim 1, wherein the mobile terminal comprises:
    an acquirer that acquires at least one control instruction for controlling the motor vehicle issued by the user; and
    a transmitter that transmits this control instruction to the motor vehicle's computer,
    the method further comprising, in the course of said automatic parking step, controlling, by the computer, the wheel orientation controller and the power train controller according to each control instruction received from the mobile terminal.

6. The method for interactive control as claimed in claim 5, wherein said control instruction is included in the following list:
    an instruction for turning the lighting of the motor vehicle on or off,
    the type of maneuver to be executed,
    a gear to be engaged,
    an instruction to interrupt the parking maneuver,
    an instruction to continue the parking maneuver, or
    an item of data relating to the user's ability to continue the parking maneuver.

7. The method for interactive control as claimed in claim 1, wherein, prior to said automatic parking step, a step of networking the mobile terminal with the motor vehicle's computer is provided in the course of which the mobile terminal and the computer exchange at least one item of networking data.

8. The method for interactive control as claimed in claim 7, wherein said item of networking data is included in the following list:
    a communication language for the user,
    a piece of information characterizing the motor vehicle,
    a piece of information characterizing the mobile terminal,
    a piece of information supplying the version of an application stored in the motor vehicle's computer,
    a piece of information supplying the version of an application stored in the mobile terminal, or
    a priority status of the application stored in the mobile terminal.

* * * * *